Aug. 19, 1969 J. C. MITCHELL, JR 3,462,709

TUNNEL DIODE MICROWAVE OSCILLATOR

Filed Dec. 27, 1967 4 Sheets-Sheet 1

JAMES C. MITCHELL, JR.
INVENTOR.

BY

Roy Miller
ATTORNEY

United States Patent Office 3,462,709

Patented Aug. 19, 1969

3,462,709

TUNNEL DIODE MICROWAVE OSCILLATOR

James C. Mitchell, Jr., Canoga Park, Calif., assignor to the United States of America as represented by the Secretary of the Navy Filed Dec. 27, 1967, Ser. No. 693,973
Int. Cl. H03b 5/18, 7/12, 5/24
U.S. Cl. 331—96 7 Claims

ABSTRACT OF THE DISCLOSURE

An apparatus for producing microwave electrical oscillations using a cascade circuit comprising tunnel diode negative resistance elements and distributed parameter capacitors and inductors.

Government interest

The invention described herein may be manufactured and used by or for the Government of the United States of America for governmental purposes without the payment of any royalties thereon or therefor.

Background of the invention

The classical explanation of the theory of oscillation is merely based upon an assumption that the system is linear and oscillations occur if the dissipative elements in the circuit are zero, i.e., in a series circuit the total loop resistance equals zero. Using the pole-zero concept, the poles of a transfer function or the roots of the determinant of a circuit must lies upon the $j\omega$ or frequency axis for true sinusoidal oscillation. The use of an active negative resistance element, such as a tunnel diode, in a simple R-L-C loop is a simple means for satisfying oscillation criteria. The negative resistance element supplies energy to counterbalance the losses due to the inherent resistance in an R-L-C circuit. The frequency of oscillation for an R-L-C circuit is given by the relationship $$F=1/2\pi\sqrt{1/LC}$$

Oscillation at microwave frequencies demands that ordinary lumped parameter reactive elements be replaced with distributed parameter reactive elements such as transmission line, strip line or the like because the output signal from the oscillator takes the form of electromagnetic waves which must propagate within a waveguide.

Summary

In accordance with the present invention the equivalent of an R-L-C circuit is constructed using distributed parameter reactive elements such as transmission line, strip line or the like, and tunnel diode negative resistance elements. The reactive elements are chosen so that the relationship $$F=1/2\pi\sqrt{1/LC}$$

satisfies the criteria for microwave oscillation.

Description of the preferred embodiments

Figure 7:
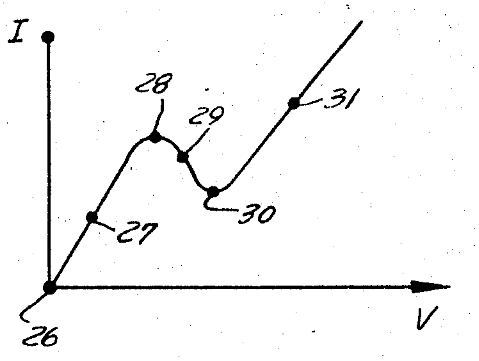
FIG. 7 is a voltage current characteristic curve of a negative resistance device, such as a tunnel diode, in which curve the ordinate is current and the abscissa is voltage.

In the characteristic curve of FIG. 7, 26 is the origin at which there is no current and no voltage, 27 is a point in a region of positive resistance, 28 is a transition point, 29 is a point in a region of negative resistance, 30 is another transition point, and 31 is a point in a region of positive resistance. It can be seen that the device represented by this operating curve may operate alternately in a negative resistance region and in an adjacent positive resistance region. For continuous oscillation, the circuit parameters are chosen so that the tunnel diodes used in the present invention operate only in the region of negative resistance.

Figure 1:
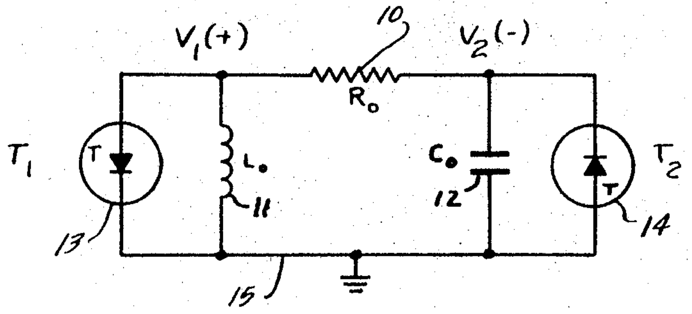
FIG. 1 is a schematic diagram of an oscillator employing tunnel diodes as negative resistance elements.

An oscillator circuit utilizing tunnel diodes is shown in FIG. 1. Two node voltage sources; $V_1$ a positive high impedance source, and $V_2$ a negative high impedance source, are established with respect to ground plane 15. A tunnel diode 13 and an inductor 11 are shunted and connected between the positive potential node $V_1$ and the ground plane 15. A second tunnel diode 14 shunted with capacitor 12 is similarly connected between ground plane 15 and voltage node $V_2$. A resistance 10 is connected between the two voltage nodes $V_1$ and $V_2$.

Figure 2:
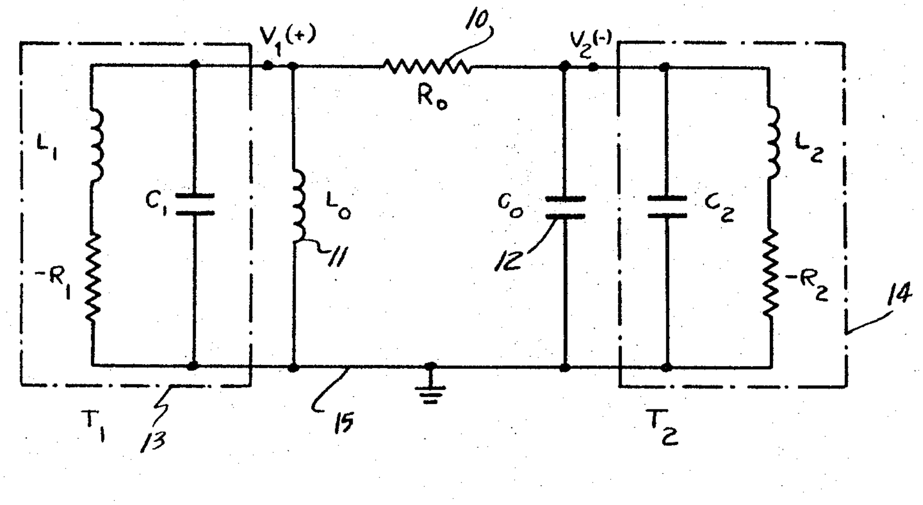
FIG. 2 is a schematic diagram of the oscillator of FIG. 1 with the tunnel diodes replaced by their lumped parameter equivalents.

FIG. 2 is the circuit of FIG. 1, with tunnel diodes 13 and 14 removed, and their equivalent circuits substituted. The equivalent circuit for tunnel diode 13 is shown as the series connection of negative resistance $R_1$ and inductor $L_1$ in parallel with capacitor $C_1$ wherein $R_1$, $L_1$ and $C_1$ are the characteristic resistance, inductance and capacitance of the tunnel diode 13. The equivalent circuit for tunnel diode 14 is represented by $R_2$, $L_2$ and $C_2$, the characteristic resistance, inductance and capacitance, respectively.

Figure 3:
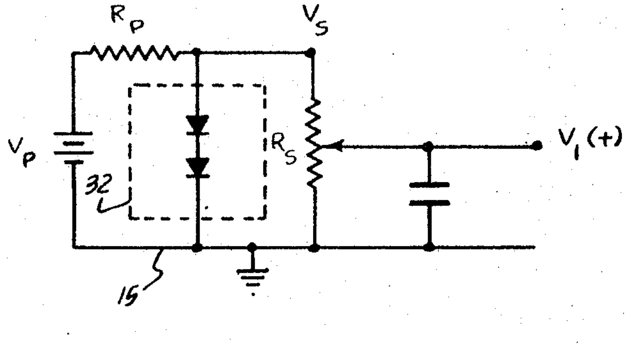
FIG. 3 is a schematic of a positive power supply which may be used with the oscillator of FIG. 1 and FIG. 2.

FIG. 3 is a schematic of a high impedance power supply which may be used in conjunction with the oscillator shown in FIG. 1. A voltage source $V_P$ is placed in series with resistance $R_R$ and back biased by diodes 32, which diodes 32 are shunted by resistor $R_S$. Output voltage $V_1$ is obtained by tapping resistor $R_S$ to achieve the desired amount of bias voltage $V_1$.

Figure 4:
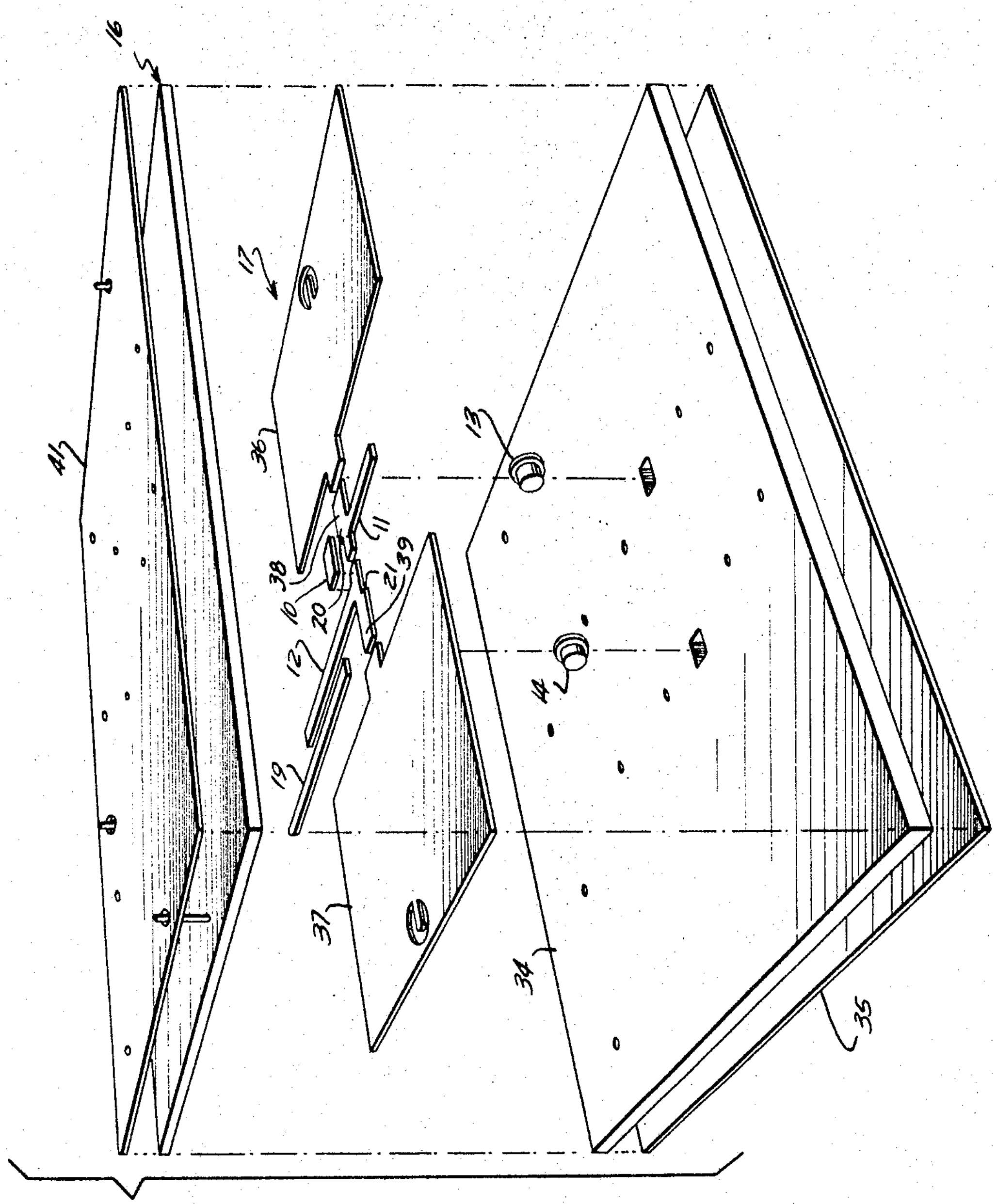
FIG. 4 is a diagrammatic view of one embodiment of the invention.

A circuit using lumped parameter inductors and capacitors in the manner of FIG. 1 will operate reasonably well up to 60 megahertz. To achieve microwave frequency operation the required value for the inductor becomes so small that standard lumped parameter wire inductors cannot be used. FIG. 4 illustrates the use of strip line inductors and capacitors in a sandwich configuration to produce the requisite capacitance and inductance. The sandwich of FIG. 4 consists of five layers. Insulating layers 16 and 34 may be made of any dielectric material, for example Rexolite 2200 or the like. Insulating layer 16 is coated with copper ground plane 41, and insulating layer 34 is coated with copper ground plane 35. Conductive sheet 17 is applied to insulating layer 34 on the side opposite ground plane 35, the coating 17 having the configuration illustrated in FIG. 5. As shown in FIG. 4 a sandwich is created by bonding insulating layers 16 and 34 to one another so that ground planes 35 and 41 appear on the outside of the sandwich. The bonding may be accomplished by cementing means or by fastening means such as bolts placed in holes drilled through the various layers.

Figure 5:
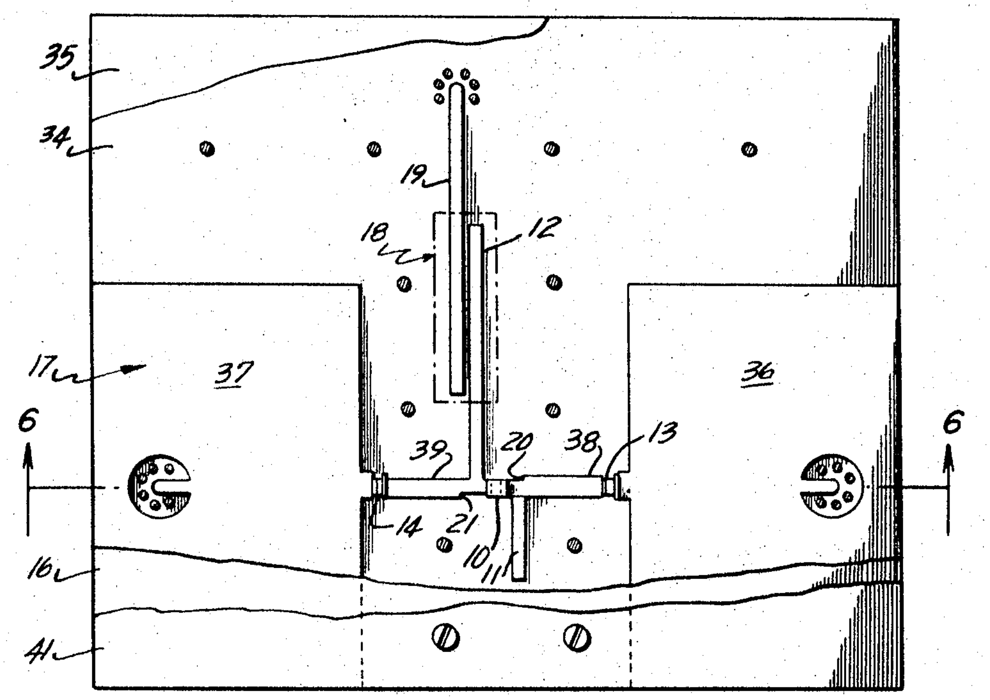
FIG. 5 is a sectional view of the layers of the embodiment shown in FIG. 4.
Figure 6:
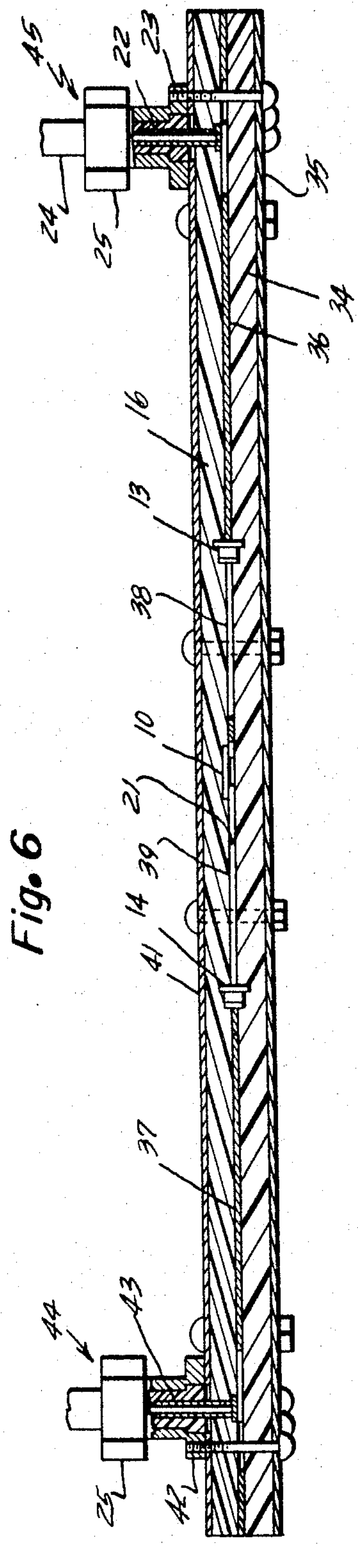
FIG. 6 is a cross sectional view along the axis 6—6 as indicated in FIG. 5.

FIG. 6 is a cross-sectional view along axis 6—6 as shown in FIG. 5. Positive potential $V_1$ and negative potential $V_2$ are placed upon plates 36 and 37 respectively by means of coaxial connector mounts 42 and 23 which are operatively connected to ground plane 41. Holes drilled in ground plane 41 and insulating layer 16 permit center conductors 43 and 22 of coaxial cables 44 and 45 respectively to make contact with plates 36 and 37. Other conductor 24 of coaxial cable 45 is secured by fastener 25 to connector mount 23. Thus, voltage $V_2$ may be applied to plate 37 via center conductor 22 and similarly voltage $V_1$ may be applied to plate 36 via center conductor 43.

FIG. 5 shows positive voltage $V_1$ placed upon plate 36 which is operatively connected to the cathode of tunnel diode 13. The anode of tunnel diode 13 is fastened to strip line section 38 which is attached to inductance 11 through matching transformer 20. Resistor 10, which may be of the Filmohm type or the like, joins inductance 11 and capacitance 12, which is connected to strip line 39 through matching transformer 21. Tunnel diode 14 is electrically placed so that its cathode meets stripline 39 and its anode connects to plate 37 which is biased through coaxial connector 23 with negative potential $V_2$. Output strip 19 is placed near capacitance 12 so that coplanar coupling occurs within region 18, and the output is monitored externally through coaxial connector 40.

Figure 8:
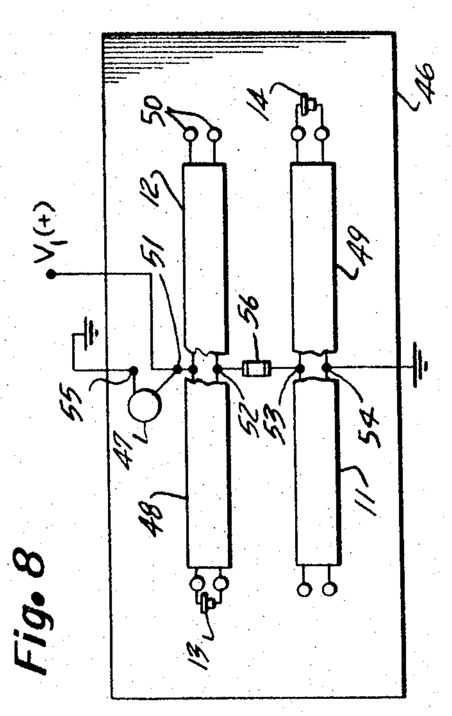
FIG. 8 is a diagrammatic view of a second embodiment of the invention.

FIG. 8 describes a second embodiment of the invention. In this embodiment twin wire transmission line such as twisted line, television lead-in, or coaxial cable is used to create distributed parameter reactive elements. Transmission line segments 11, 12, 48 and 49 are fastened to mounting board 46 by mounting tacks 50 and nodes 54 and 55 are grounded. Mounting board 46 may be constructed of any insulator having suitable handling properties. Coupling capacitor 47 is placed between grounded node 55 and voltage node 51, and output resistor 56 is placed between nodes 52 and 53. It is well known in transmission line theory that open ended two wire transmission lines operating at microwave frequencies can be made to take on various characteristic impedances such as an open circuit, short circuit, capacitive reactance or inductive reactance by adjusting the length of the line to be greater or less than one-quarter wavelength for a particular frequency of operation. If the line has a length which is exactly an odd multiple of one-quarter wavelength, the line appears as a short circuit. If the line has a length which is exactly an even multiple of one-quarter wavelength, the line appears as an open circuit. If the length of the line is expressed by:

$$\frac{(2N-1)\lambda}{8}$$

where $\lambda$=wavelength.

When:

N=any odd number, the line appears as an inductive reactance

N=any even number, the line appears as a capacitive reactance.

Transmission line strip 12, which is a capacitive reactance having a length $(2N-1)\lambda/8$ where N is any even number, is connected at one end to nodes 51 and 52 and at the other end the terminals are open ended. Transmission line strip 48 is shunted with strip 12 at terminals 51 and 52, and terminated at the opposite end of tunnel diode 13 so that the cathode and the anode of tunnel diode 13 attach to the wires of transmission line strip 48 which are in turn linked to nodes 51 and 52 respectively. The length of transmission line strip 48 is adjusted to have the requisite characteristic impedance to match the characteristic impedance of diode 13 to the characteristic impedance of output resistor 56. Transmission line strip 11, which is an inductive reactance having a length $(2N-1)\lambda/8$ where N is any odd number is shunted with strip 49 at nodes 53 and 54. The end of strip 11 opposite the end connected to nodes 53 and 54 is open-ended and the similar end of strip 49 is terminated by tunnel diode 14 so that the cathode and anode of tunnel diode 14 attach to the wires of transmission line strip 49 which are again in turn linked to nodes 53 and 54 respectively. The length of transmission line strip 49 is adjusted to have the requisite characteristic impedance to match the characteristic impedance of diode 14 to the characteristic impedance of output resistor 56. Output from the oscillator is taken across output resistor 56, which might be the internal resistance of an amplifier.

If variable length coaxial cable is used as the transmission line described above, the frequency of oscillation can be changed by adjusting the length of the coaxial cable corresponding to capacitance 12 and inductance 11.

It should be understood that the foreging disclosure relates only to preferred embodiments of the invention and that numerous modifications or operations may be made therein without departing from the spirit and the scope of the invention.

What is claimed is:

1. A microwave oscillator comprising:

first and second diodes, each having an anode and a cathode;

a resistance means having at least two terminals;

means for electrically connecting one of said terminals of said resistance means in series relationship with the cathode of the first diode, and means for electrically connecting the other of said terminals of said resistance means in series relationship with the anode of the second diode;

means for grounding the anode of the first diode and the cathode of the second diode;

a resonant circuit coupled across said first diode to provide in combination with the internal capacitance and inductance of said diode an inductive reactance;

a second resonant circuit coupled across said second diode to provide in combination with the internal capacitance and inductance of said diode a capacitive reactance; and means for biasing said first and second diodes to exhibit negative resistance.

2. The oscillator as described in claim 1 wherein the first and second diodes are tunnel diodes.

3. The oscillator as described in claim 2 wherein the first and second resonant circuits comprise:

a first and second sheet of dielectric material;

a copper ground plane coating placed on one side of said first sheet of dielectric material;

a second copper coating placed on the opposite side of said first sheet of dielectric material, said copper coating having a configuration comprising:

- a rectangular area having means for receiving excitation from a positive voltage source and means for attaching the cathode of a first tunnel diode;
- a first narrow rectangular strip having means for attaching the anode of the first tunnel diode, said strip being placed perpendicular to and a sufficient distance away from said rectangular area to permit mounting of the first tunnel diode;
- a second rectangular strip of narrower width than said first strip perpendicularly joined to said first strip at a point along the first strip farthest from the point of attachment of the first tunnel diode;
- a third short rectangular strip of narrower width than and joined in alignment with said first strip at the juncture of the first and second strip so that the third strip is perpendicular to the second strip, said strip having means for attaching one terminal of a resistor;
- a fourth short narrow strip of the same configuration as and placed in alignment with said third strip, with means for attaching a second terminal of said resistor;
- a fifth strip perpendicularly joined with said fourth strip at a point along the fourth strip farthest from the means for attaching the second terminal of said resistor;

a sixth strip having the same width as the first strip, attached in alignment with said first strip, perpendicular to said fifth strip and having means for attaching the cathode of a second tunnel diode at the end opposite to the point of contact with the fifth strip;

a second rectangular area with means for attaching the anode of said second tunnel diode and having means for receiving excitation from a negative voltage source;

a seventh strip placed adjacent and parallel to but not touching said fifth strip so coplanar coupling can occur, said seventh strip extending beyond the outermost point on said fifth strip and having a terminal for monitoring the output of the oscillator located on the outermost point of the seventh strip;

said second dielectric sheet placed substantially coextensive with and contiguous to the second coating on said first dielectric sheet and having means for permitting said tunnel diodes to fit between said dielectric sheets;

a second copper ground plane coated on the side of the second dielectric sheet opposite to the side placed substantially coextensive with and contiguous to the second coating on said first dielectric sheet; and bonding means to hold both dielectric sheets together.

4. The oscillator as described in claim 2 wherein the first and second resonant circuits comprise:

a base constructed of an insulator and having five node points;

the first and fifth node points being grounded;

a capacitor coupled across the first grounded node point and a second node point;

a first section of two-wire transmission line, one end of which is placed across the second and third node points, the other end is open circuited, and the length chosen is expressed by $(2N-1)\lambda/8$ where $\lambda$=wavelength corresponding to the desired oscillating frequency and N=any even number so that the section acts as a capacitive reactance;

the resistance means having two terminals is coupled across the third and fourth node points;

a second section of two-wire transmission line, one end of which is placed across the second and third node points, the other end is terminated with a first tunnel diode; and the length is adjusted so the section has the requisite characteristic impedance to match the characteristic impedance of the first tunnel diode with the characteristic impedance of the resistance means;

a third section of two-wire transmission line, one end of which is placed across the fourth and fifth node points, the other end is open circuited, and the length chosen is expressed by $(2N-1)\lambda/8$ where $\lambda$=wavelength corresponding to the desired oscillating frequency and N=any odd number so that the section acts as an inductive reactance; and a fourth section of two-wire transmission line, one end of which is placed across the fourth and fifth node points, the other end is terminated with a second tunnel diode, and the length is adjusted so the section has the requisite characteristic impedance to match the characteristic impedance of the second tunnel diode with the characteristic impedance of the resistance means.

5. The oscillator of claim 4 wherein the transmission line is twin "television type" lead-in wire.

6. The oscillator of claim 4 wherein the transmission line is coaxial cable.

7. The oscillator of claim 6 wherein the coaxial cable transmission line is of adjustable length to change the frequency of oscillation.

References Cited

UNITED STATES PATENTS

| | | | |
|---|---|---|---|
| 3,195,071 | 7/1965 | Steinhoff. | |
| 3,252,112 | 5/1966 | Hauer | 307—322 X |

ROY LAKE, Primary Examiner

SIEGFRIED H. GRIMM, Assistant Examiner

U.S. Cl. X.R.

307—322; 331—107; 333—82